(12) United States Patent
Acosta Ramirez et al.

(10) Patent No.: US 10,851,630 B2
(45) Date of Patent: Dec. 1, 2020

(54) PRODUCTION OF HYDROCARBON USING DIRECT-CONTACT STEAM GENERATION

(71) Applicant: Suncor Energy Inc., Calgary (CA)

(72) Inventors: Hugo Acosta Ramirez, Calgary (CA); Todd Pugsley, Calgary (CA)

(73) Assignee: SUNCOR ENERGY INC., Calgary (CA)

( * ) Notice: Subject to any disclaimer, the term of this patent is extended or adjusted under 35 U.S.C. 154(b) by 270 days.

(21) Appl. No.: 15/716,821

(22) Filed: Sep. 27, 2017

(65) Prior Publication Data
US 2018/0087354 A1    Mar. 29, 2018

(30) Foreign Application Priority Data
Sep. 28, 2016  (CA) ..................... 2943314

(51) Int. Cl.
| | | |
|---|---|---|
| *E21B 43/24* | (2006.01) | |
| *C01B 32/50* | (2017.01) | |
| *C01C 1/00* | (2006.01) | |
| *E21B 43/285* | (2006.01) | |
| *F22B 1/18* | (2006.01) | |

(Continued)

(52) U.S. Cl.
CPC .............. *E21B 43/24* (2013.01); *C01B 32/50* (2017.08); *C01C 1/00* (2013.01); *E21B 43/2408* (2013.01); *E21B 43/285* (2013.01); *F22B 1/1853* (2013.01); *F22B 1/22* (2013.01); *F23L 7/005* (2013.01); *F23L 7/007* (2013.01); *C01B 13/00* (2013.01); *C10G 1/047* (2013.01);
(Continued)

(58) Field of Classification Search
CPC .... E21B 43/24; E21B 43/2408; E21B 43/285; C01B 32/50; C01B 13/14; C01B 13/00; F22B 1/1853; F22B 1/22
See application file for complete search history.

(56) References Cited

U.S. PATENT DOCUMENTS

| | | | |
|---|---|---|---|
| 4,322,603 | A | 3/1982 | Bright |
| 4,488,598 | A | 12/1984 | Duerksen |

(Continued)

FOREIGN PATENT DOCUMENTS

| | | |
|---|---|---|
| CA | 1 166 531 | 5/1984 |
| CA | 2 815 144 A1 | 11/2013 |

(Continued)

OTHER PUBLICATIONS

Gates, I.D. et al., "Impact of Carbon Dioxide Co-Injection on the Performance of SAGD," 2011, *World Heavy Oil Congress*, pp. 1-14, CA.

*Primary Examiner* — Crystal J Miller
(74) *Attorney, Agent, or Firm* — Brinks Gilson & Lione

(57) ABSTRACT

A process for in situ thermal recovery of hydrocarbons from a reservoir is provided. The process includes: providing an oxygen-enriched mixture, fuel, feedwater and an additive including at least one of ammonia, urea and a volatile amine to a Direct-Contact Steam Generator (DCSG); operating the DCSG, including contacting the feedwater and the additive with hot combustion gas to obtain a steam-based mixture including steam, $CO_2$ and the additive; injecting the steam-based mixture or a stream derived from the steam-based mixture into the reservoir to mobilize the hydrocarbons therein; and producing a produced fluid including the hydrocarbons.

29 Claims, 4 Drawing Sheets

(51) Int. Cl.
  F22B 1/22 (2006.01)
  F23L 7/00 (2006.01)
  *C01B 13/00* (2006.01)
  *C10G 1/04* (2006.01)
  *E21C 41/24* (2006.01)
(52) U.S. Cl.
  CPC ............ *E21C 41/24* (2013.01); *Y02E 20/322* (2013.01); *Y02E 20/344* (2013.01)

(56) References Cited

U.S. PATENT DOCUMENTS

| | | | |
|---|---|---|---|
| 4,572,296 A * | 2/1986 | Watkins | C09K 8/592 |
| | | | 166/303 |
| 5,085,275 A | 2/1992 | Gondouin | |
| 6,205,289 B1 | 3/2001 | Kobro | |
| 6,454,010 B1 | 9/2002 | Thomas et al. | |
| 7,628,204 B2 | 12/2009 | Iqbal et al. | |
| 8,167,041 B2 | 5/2012 | Chiesa et al. | |
| 8,430,947 B2 * | 4/2013 | Latimer | B01D 53/60 |
| | | | 95/158 |
| 8,468,980 B2 * | 6/2013 | Betzer Tsilevich | F22B 1/1853 |
| | | | 122/11 |
| 8,646,415 B2 * | 2/2014 | Betzer Tsilevich | F22B 1/1853 |
| | | | 122/11 |
| 9,114,406 B2 * | 8/2015 | Betzer Tsilevich | B03D 1/02 |
| 9,115,575 B2 * | 8/2015 | MacAdam | E21B 43/24 |
| 10,246,979 B2 * | 4/2019 | Donald | E21B 43/2408 |
| 2008/0078552 A1 | 4/2008 | Donnelly et al. | |
| 2008/0257543 A1 | 10/2008 | De Francesco et al. | |
| 2008/0289821 A1 | 11/2008 | Betzer Tsilevich | |
| 2008/0289822 A1 | 11/2008 | Betzer Tsilevich | |
| 2010/0037835 A1 * | 2/2010 | Betzer Tsilevich | F22B 1/1853 |
| | | | 122/11 |
| 2010/0147516 A1 | 6/2010 | Betzer Zilevitch | |
| 2010/0200231 A1 | 8/2010 | Minnich | |
| 2010/0224363 A1 | 9/2010 | Anderson et al. | |
| 2010/0224370 A1 | 9/2010 | Donnelly et al. | |
| 2011/0005749 A1 * | 1/2011 | Curole | B01D 61/027 |
| | | | 166/272.3 |
| 2011/0011559 A1 * | 1/2011 | Latimer | B01D 53/60 |
| | | | 165/48.1 |
| 2011/0036308 A1 * | 2/2011 | Betzer-Zilevitch | |
| | | | F22B 1/1853 |
| | | | 122/5.52 |
| 2011/0089013 A1 | 4/2011 | Sakurai et al. | |
| 2011/0259586 A1 | 10/2011 | Latimer et al. | |
| 2012/0000642 A1 * | 1/2012 | Betzer Tsilevich | B03D 1/02 |
| | | | 166/57 |
| 2012/0073810 A1 | 3/2012 | Macadam et al. | |
| 2012/0222426 A1 * | 9/2012 | Macadam | F02C 6/18 |
| | | | 60/783 |
| 2012/0325470 A1 | 12/2012 | Gupta et al. | |
| 2013/0062065 A1 * | 3/2013 | MacAdam | E21B 36/02 |
| | | | 166/302 |
| 2013/0068458 A1 | 3/2013 | Macadam et al. | |
| 2014/0060825 A1 * | 3/2014 | MacAdam | F01K 21/04 |
| | | | 166/272.3 |
| 2015/0090640 A1 * | 4/2015 | Dale | C02F 5/12 |
| | | | 208/363 |
| 2015/0275637 A1 * | 10/2015 | Donald | E21B 43/2408 |
| | | | 166/272.4 |
| 2015/0285050 A1 * | 10/2015 | Kerr | E21B 43/24 |
| | | | 166/303 |
| 2016/0153270 A1 * | 6/2016 | Chen | E21B 43/2408 |
| | | | 166/401 |
| 2016/0341021 A1 * | 11/2016 | Chen | E21B 43/305 |
| 2019/0169970 A1 | 6/2019 | Donald et al. | |

FOREIGN PATENT DOCUMENTS

| | | | | |
|---|---|---|---|---|
| CA | 2847881 C * | 1/2018 | ........ | E21B 43/2408 |
| RU | 2 149 258 C1 | 5/2000 | | |
| WO | WO 2012/122041 A2 | 9/2012 | | |

* cited by examiner

PRODUCTION OF HYDROCARBON USING DIRECT-CONTACT STEAM GENERATION

CROSS-RELATED APPLICATION

The present patent application claims priority on Canadian patent application No. 2,943,314, which is hereby incorporated by reference in its entirety.

TECHNICAL FIELD

The technical field generally relates to in situ hydrocarbon recovery operations, and more particularly to steam-assisted hydrocarbon recovery operations.

BACKGROUND

Steam-assisted hydrocarbon recovery techniques are widely used to recover hydrocarbons such as heavy oil and/or bitumen from subsurface reservoirs. Steam-assisted gravity drainage (SAGD) is one of such techniques. Typically, in a SAGD hydrocarbon recovery operation, a pair of horizontal wells is drilled into a hydrocarbon-bearing reservoir, such as an oil sands reservoir, and steam is continuously injected into the reservoir via the upper injection well to heat and reduce the viscosity of the hydrocarbons. The mobilized hydrocarbons drain into the lower production well and are recovered to surface.

In SAGD operations or other in situ hydrocarbon recovery operations, it may be desirable under certain circumstances to co-inject additives, such as ammonia, along with the steam. However, with existing techniques, the handling of such additives and their integration within the steam stream can have certain drawbacks, such as high cost. For example, some scenarios using chemical skids in order to co-inject the additives can lead to increased safety risks and increased surface footprint (i.e., increased maintenance and supervision). Chemical skids can also require production shut-in for tie-in, and can add complexity because of the handling of chemicals (e.g., safety) and more demanding logistics (e.g., loading, chemical inventory).

Various challenges still exist in the area of in situ hydrocarbon recovery and steam generation.

SUMMARY

In some implementations, a process for in situ thermal recovery of hydrocarbons from a reservoir is provided. The process comprises: providing an oxygen-enriched mixture, fuel, feedwater and an additive comprising at least one of ammonia, urea and a volatile amine to a direct-contact steam generator (DCSG); operating the DCSG, comprising contacting the feedwater and the additive with hot combustion gas to obtain a steam-based mixture comprising steam, $CO_2$ and the additive; injecting the steam-based mixture or a stream derived from the steam-based mixture into the reservoir to mobilize the hydrocarbons therein; and producing a produced fluid comprising the hydrocarbons.

In some implementations, the additive comprises ammonia.

In some implementations, the ammonia is provided as an ammonium hydroxide solution.

In some implementations, the concentration of ammonia and/or volatile amine in the steam-based mixture is between about 0.1 wt % and about 30 wt %.

In some implementations, the steam-based mixture comprises the additive in a gaseous and/or vapor state.

In some implementations, the additive further comprises at least one of a viscosity reduction agent and a well integrity agent.

In some implementations, the well integrity agent is chosen from the group consisting of an anticorrosive agent, an antifouling agent, a scale inhibitor and thermally stable cement.

In some implementations, the process further includes providing a waste stream comprising volatile organic components (VOCs) to the DCSG, in order to flare the VOCs in the DCSG.

In some implementations, the feedwater and the additive are provided as a single feed stream to the DCSG.

In some implementations, the feedwater is provided as a feedwater stream and the additive is provided as a separate additive stream, to the DCSG.

In some implementations, the feedwater stream is contacted with the hot combustion gas for a longer time period than the additive stream.

In some implementations, the process further includes separating at least part of the $CO_2$ from the steam-based mixture, to obtain a $CO_2$-lean steam-based mixture as the stream derived from the steam-based mixture.

In some implementations, the process further includes separating the produced fluid into produced gas, a non-gaseous hydrocarbon component and produced water.

In some implementations, the feedwater comprises at least part of the produced water.

In some implementations, the feedwater further comprises makeup water.

In some implementations, the concentration of the makeup water in the feedwater is of up to about 5 wt % of the feedwater.

In some implementations, the fuel comprises at least part of the produced gas.

In some implementations, a process for SAGD recovery of hydrocarbons from a reservoir is provided. The process includes: providing an oxygen-enriched mixture, fuel, feedwater and an additive to a DCSG, the additive comprising at least one of ammonia, urea and a volatile amine; operating the DCSG, comprising contacting the feedwater and the additive with hot combustion gas to obtain a steam-based mixture comprising steam, $CO_2$ and the additive; injecting the steam-based mixture or a stream derived from the steam-based mixture into the reservoir via a SAGD injection well to mobilize hydrocarbons therein; and recovering the hydrocarbons as produced fluids from a SAGD production well.

In some implementations, the additive comprises ammonia.

In some implementations, the ammonia is provided as an ammonium hydroxide solution.

In some implementations, the concentration of the ammonia and/or volatile amine in the steam-based mixture is between about 0.1 wt % and about 30 wt %.

In some implementations, the steam-based mixture comprises the additive in a gaseous state.

In some implementations, the additive further comprises at least one of a viscosity reduction agent and a well integrity agent.

In some implementations, the well integrity agent is chosen from the group consisting of an anticorrosive agent, an antifouling agent, a scale inhibitor and thermally stable cement.

In some implementations, the process further includes providing a waste stream comprising volatile organic components (VOCs) to the DCSG, in order to flare the VOCs in the DCSG.

In some implementations, the feedwater and the additive are provided as a single feed stream to the DCSG.

In some implementations, the feedwater is provided as a feedwater stream and the additive is provided as a separate additive stream, to the DCSG.

In some implementations, the feedwater stream is contacted with the hot combustion gas for a longer time period than the additive stream.

In some implementations, the process further includes separating at least part of the $CO_2$ from the steam-based mixture, to obtain a $CO_2$-lean steam-based mixture as the stream derived from the steam-based mixture.

In some implementations, the process further includes separating the produced fluid into produced gas, a non-gaseous hydrocarbon component and produced water.

In some implementations, the feedwater comprises at least part of the produced water.

In some implementations, the feedwater further comprises makeup water.

In some implementations, the concentration of the makeup water in the feedwater is of up to about 5 wt % of the feedwater.

In some implementations, the fuel comprises at least part of the produced gas.

In some implementations, a process for generating a steam-based mixture is provided. the process includes: providing an oxygen-enriched mixture, fuel, feedwater and an additive comprising at least one of ammonia, urea and a volatile amine, to a DCSG; and operating the DCSG, comprising contacting the feedwater and the additive with hot combustion gas to obtain the steam-based mixture comprising steam, $CO_2$ and the additive.

In some implementations, the additive comprises ammonia.

In some implementations, the ammonia is provided as an ammonium hydroxide solution.

In some implementations, the concentration of the ammonia and/or volatile amine in the steam-based mixture is between about 0.1 wt % and about 30 wt %.

In some implementations, the steam-based mixture comprises the additive in a gaseous state.

In some implementations, the feedwater and the additive are provided as a single feed stream to the DCSG.

In some implementations, the feedwater is provided as a feedwater stream and the additive is provided as a separate additive stream, to the DCSG.

In some implementations, the feedwater stream is contacted with the hot combustion gas for a longer time period than the additive stream.

In some implementations, the process further includes separating at least part of the $CO_2$ from the steam-based mixture, to obtain a $CO_2$-lean steam-based mixture.

In some implementations, the feedwater comprises at least part of a produced water component from an in situ hydrocarbon recovery operation.

In some implementations, the feedwater further comprises makeup water.

In some implementations, the concentration of the makeup water in the feedwater is of up to about 5 wt % of the feedwater.

In some implementations, the fuel comprises at least part of a produced gas component from an in situ hydrocarbon recovery operation.

In some implementations, a system for recovering hydrocarbons from a reservoir is provided. The system includes: a DCSG for generating a steam-based mixture, the DCSG comprising: an oxygen inlet for receiving an oxygen-enriched mixture; a fuel inlet for receiving fuel; and at least one inlet for receiving feedwater and an additive comprising at least one of ammonia, urea and a volatile amine, the steam-based mixture comprising steam, $CO_2$ and the additive; an injection well in fluid communication with the DCSG to receive the steam-based mixture or a stream derived from the steam-based mixture; a production well for recovering produced fluids from the reservoir; and a hydrocarbon separating unit in fluid communication with the production well to receive the produced fluids and separate the hydrocarbons from the produced fluids.

In some implementations, the additive comprises ammonia.

In some implementations, the ammonia is provided as an ammonium hydroxide solution.

In some implementations, the steam-based mixture comprises the additive in a gaseous state.

In some implementations, the additive further comprises at least one of a viscosity reduction agent and a well integrity agent.

In some implementations, the concentration of the ammonia and/or volatile amine in the steam-based mixture is between about 0.1 wt % and about 30 wt %.

In some implementations, the well integrity agent is chosen from the group consisting of an anticorrosive agent, an antifouling agent, a scale inhibitor and thermally stable cement.

In some implementations, the DCSG further comprises a waste inlet for receiving a waste stream comprising volatile organic components (VOCs) to the DCSG, in order to flare the VOCs by contact with the hot combustion gas.

In some implementations, the at least one inlet for receiving the feedwater and the additive is a single inlet, such that the feedwater and the additive are provided as a single feed stream to the DCSG.

In some implementations, the at least one inlet for receiving the feedwater and the additive comprises a feedwater inlet and a separate additive inlet, such that the feedwater is provided as a feedwater stream and the additive is provided as a separate additive stream, to the DCSG.

In some implementations, the feedwater inlet and the additive inlet are positioned such that the feedwater stream is contacted with hot combustion gas for a longer time period than the additive stream.

In some implementations, the system further includes a steam-$CO_2$ separator downstream of the DCSG for separating at least part of the $CO_2$ from the steam-based mixture and obtain a $CO_2$-lean steam-based mixture.

In some implementations, the hydrocarbon separating unit separates the produced fluids into produced gas, a non-gaseous hydrocarbon component and produced water.

In some implementations, the system further includes a water recycle line for providing at least part of the produced water as at least part of the feedwater of the DCSG.

In some implementations, the system further includes a makeup water line for supplying makeup water to the DCSG from a water source.

In some implementations, the concentration of the makeup water in the feedwater is between of up to about 5 wt % of the feedwater.

In some implementations, the system further includes a gas recycle line for providing at least part of the produced gas as at least part of the fuel of the DCSG.

In some implementations, a method for recovering hydrocarbons in a hydrocarbon recovery operation, the hydrocarbon recovery operation comprising an injection well and a production well overlying a reservoir from a well pad. the method includes: proximate to the well pad: recovering produced fluids from the production well; separating the produced fluids into produced water and produced hydrocarbons; operating a DCSG, comprising: providing an oxygen-enriched mixture, fuel and feedwater comprising at least a portion of the produced water, to the DCSG; providing an additive in a liquid state to the DCSG or to an outlet stream of the DCSG; generating a steam-based mixture comprising steam, $CO_2$ and the additive in a gaseous state and/or a dispersed state; injecting the steam-based mixture or a stream derived from the steam-based mixture into the injection well; and supplying the produced hydrocarbons to a distant processing facility.

In some implementations, the additive is provided to the DCSG from a location proximate to the well pad.

In some implementations, the produced hydrocarbons comprise a produced gas component and a non-gaseous hydrocarbon component.

In some implementations, at least a portion of the produced gas is used as at least a portion of the fuel for the DCSG.

In some implementations, the additive is mixed with the feedwater prior to being provided to the DCSG.

In some implementations, the additive and the feedwater are provided to the DCSG as separate feed streams.

In some implementations, the additive comprises at least one of ammonia and a volatile amine.

In some implementations, the ammonia is provided as an ammonium hydroxide solution.

In some implementations, the additive includes at least one of a viscosity reduction agent and a well integrity agent.

In some implementations, the well integrity agent is chosen from the group consisting of an anticorrosive agent, an antifouling agent, a scale inhibitor and thermally stable cement.

In some implementations, a process for in situ thermal recovery of hydrocarbons from a reservoir is provided. The process includes: providing an oxygen-enriched mixture, fuel, feedwater and an additive in liquid state to a DCSG; operating the DCSG, including contacting the feedwater and the additive with hot combustion gas to obtain a steam-based mixture including steam, $CO_2$ and the additive in a gaseous state and/or a dispersed state; injecting the steam-based mixture or a stream derived from the steam-based mixture into the reservoir to mobilize the hydrocarbons therein; and producing a produced fluid including the hydrocarbons.

In some implementations, the additive includes at least one of ammonia and a volatile amine.

In some implementations, the ammonia is provided as an ammonium hydroxide solution.

In some implementations, the additive further includes at least one of a viscosity reduction agent and a well integrity agent.

In some implementations, the well integrity agent is chosen from the group consisting of an anticorrosive agent, an antifouling agent, a scale inhibitor and thermally stable cement.

In some implementations, the process further includes providing a waste stream including volatile organic components (VOCs) to the DCSG, in order to flare the VOCs in the DCSG.

In some implementations, the feedwater and the additive are provided as a single feed stream to the DCSG.

In some implementations, the feedwater is provided as a feedwater stream and the additive is provided as a separate additive stream, to the DCSG.

In some implementations, a process for in situ thermal recovery of hydrocarbons from a reservoir is provided. The process includes: providing an oxygen-enriched mixture, fuel, feedwater and an additive in to a DCSG, the additive being carried by a heat carrier gas; operating the DCSG, including contacting the feedwater and the additive with hot combustion gas to obtain a steam-based mixture including steam, $CO_2$ and the additive, the heat carrier gas providing stability to the additive during operation of the DCSG; injecting the steam-based mixture or a stream derived from the steam-based mixture into the reservoir to mobilize the hydrocarbons therein; and producing a produced fluid including the hydrocarbons.

In some implementations, the additive further includes at least one of a viscosity reduction agent and a well integrity agent.

In some implementations, the well integrity agent is chosen from the group consisting of an anticorrosive agent, an antifouling agent, a scale inhibitor and thermally stable cement

DETAILED DESCRIPTION

Figure 1:
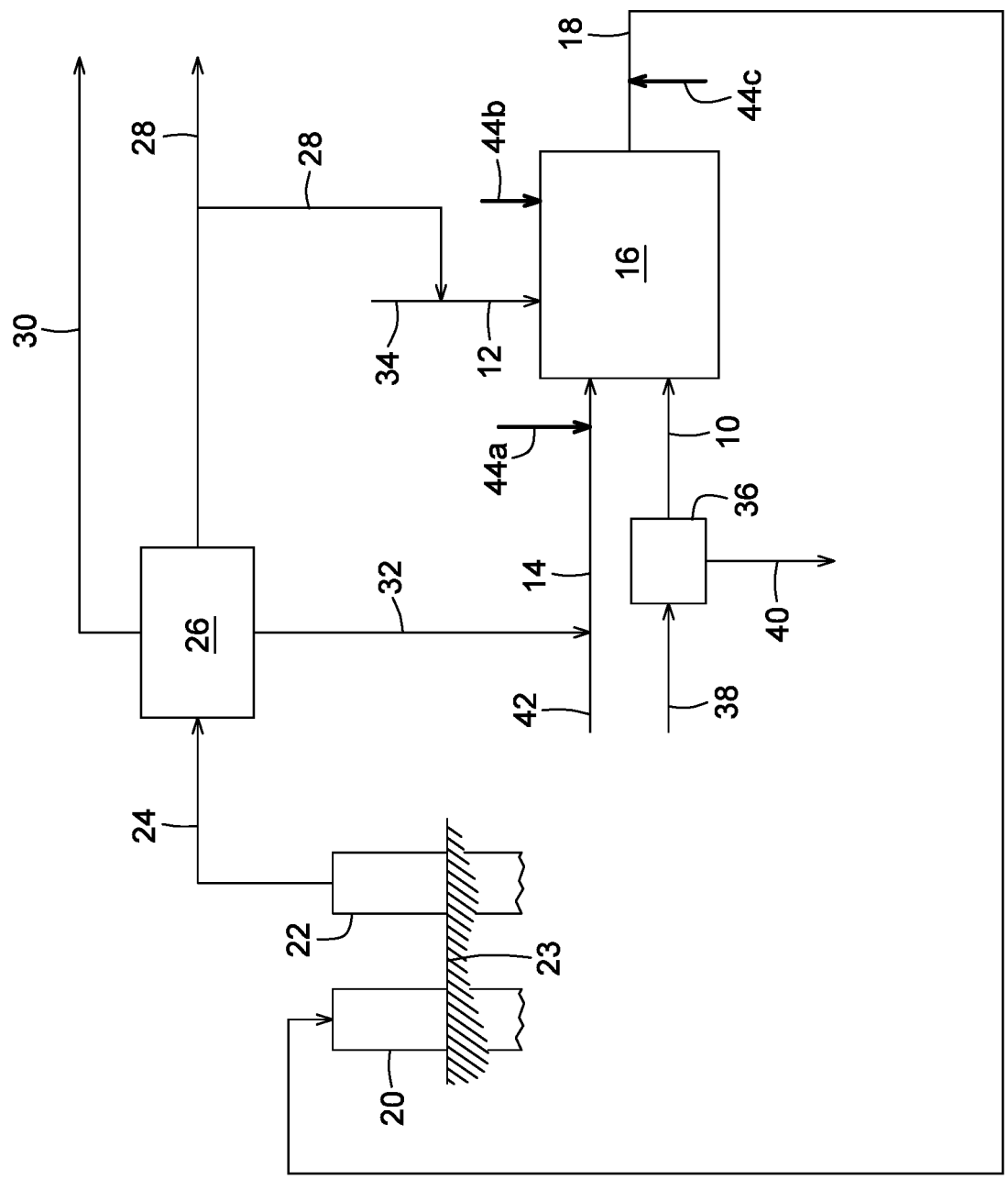
FIG. 1 is a process flow diagram of a hydrocarbon recovery operation, showing possible additive injection points.

Various techniques that are described herein enable thermal in situ recovery operations of hydrocarbons, such as steam-assisted gravity drainage (SAGD), including the use of a direct-contact steam generator (DCSG) for generating steam. The outlet stream generated by the DCSG typically includes steam and $CO_2$ and may be referred to as a combustion mixture or a steam-based mixture. While the combustion mixture can be directly injected into a reservoir to mobilize the hydrocarbons therein, in some scenarios it can be desirable to co-inject an additive into the reservoir along with the combustion mixture. In some scenarios, co-injection of an additive can improve bitumen recovery, can provide a certain benefit to existing tubing or downhole tools including electric submersible pumps (ESPs), enhance conformance, or provide solutions to formation damage. The additive can be mixed with the combustion mixture downstream of the DCSG, or can alternatively be injected into the DCSG along with feedwater so that the additive is incorporated into the steam-based mixture as the steam-based mixture is generated.

A DCSG generates steam by directly contacting feedwater with a hot combustion gas which is produced using fuel (for example, natural gas) and an oxidizing gas (for example, an oxygen-enriched gas mixture, such as purified oxygen). Depending on the oxidizing gas and fuel that are used, the combustion gas can include various amounts of carbon dioxide ($CO_2$) as well as other gases such as carbon monoxide (CO), hydrogen ($H_2$), nitrogen based compounds ($NO_x$) such as nitric oxide (NO) and nitrogen dioxide ($NO_2$), and/or sulfur based compounds ($SO_x$) such as sulfur oxides. The fuel and oxidizing gas can be premixed prior to reaching a burner, and a flame is generated in a combustion chamber, thereby forming the hot combustion gas. The feedwater is typically run down the combustion chamber in jacketed pipes and into an evaporation chamber, and the hot combustion gas evaporates the feedwater in the evaporation chamber, thereby generating the outlet stream which includes steam and combustion gas, which typically mostly includes $CO_2$.

There are several types of additives that can be incorporated into the steam-based mixture, depending for example on the nature of the reservoir, production stage (start-up, ramp up, plateau, decline, wind down), the configuration of the hydrocarbon recovery operation, economic and/or environmental parameters. In some implementations, the additive can be a liquid additive which is vaporizable and/or dispersible into the combustion mixture, such as ammonia or a volatile amine, or any other additive desired. In some scenarios, injecting the additive into the DCSG for vaporizing and/or dispersing into the combustion mixture can reduce costs and/or increase safety compared to having to vaporize the additive prior to injecting the additive into the combustion mixture.

DCSGs can be located at remote hydrocarbon recovery facilities due to their small size and scalability, and steam can thereby be generated proximate to the well pads as opposed to being generated at a distant processing facility and conveyed to the well pad. The $CO_2$ included in the combustion gas can either be co-injected with the steam into the injection well (in whole or in part), or separated prior to the injection. In some scenarios, the additives to be co-injected can be stored proximate to the well pads, at each remote hydrocarbon recovery facility, or dissolved in the feedwater thereby potentially reducing the costs and/or safety considerations. In some scenarios, using DCSGs at remote hydrocarbon recovery facilities can allow for eliminating chemical skids.

Some implementations of the technology are described in greater detail below.

Steam Generation Implementations

Referring to FIG. 1, a hydrocarbon recovery operation using steam-assisted gravity drainage is shown. It should be understood that throughout the present description, hydrocarbon recovery using SAGD is used to illustrate the various implementations. It should be understood that the processes and techniques of the present description can also be implemented using other hydrocarbon recovery processes. Non-limiting examples of such other hydrocarbon recovery processes include cyclic steam stimulation (CSS) and Vapor Extraction (VAPEX), among others. It should also be understood that the techniques of the present description can also be implemented with processes utilizing co-injection of steam and solvent.

Still referring to FIG. 1, in some implementations, an oxygen-enriched mixture 10, fuel 12 and feedwater 14 are fed to a DCSG 16. The oxygen-enriched mixture 10 can be oxygen-enriched air, or oxygen at different levels of purity. Optionally, high purity oxygen can be used. In some implementations, the oxygen-enriched mixture 10 can be generated using an oxygen module 36 which can separate an incoming air stream 38 into the oxygen-enriched mixture 10 and oxygen-lean air 40.

Still referring to FIG. 1, the DCSG 16 can be operated to obtain a steam-based mixture 18 which includes steam and $CO_2$. Depending on the type of fuel 12 and oxygen-enriched mixture 10, the steam-based mixture 18 can also include various amounts of other gases, as explained above. It is noteworthy that the concentration of $CO_2$ in an outlet stream of a DCSG which is not subjected to steam-$CO_2$ separation can be up to 12 wt %, typically between 6 wt % and 12 wt %. In some scenarios, depending for example on the properties and geological layout of the reservoir, it can be desirable to incorporate an additive into the steam-based mixture 18 and co-inject the additive into the reservoir along with the steam-based mixture 18, as will be explained in further detail herein.

Still referring to FIG. 1, the steam-based mixture 18 is injected into a hydrocarbon-bearing reservoir via an injection well 20, and produced fluids 24 are recovered from a production well 22. In some implementations, the injection well and the production well are located on a well pad 23 that is part of the hydrocarbon recovery operation. The produced fluids 24 can be separated in separator 26 into a produced gas component 28, produced non-gaseous hydrocarbons 30 and produced water 32. The produced water 32 can be oily water which can contain some solid materials.

In some implementations, the DCSG 16 can operate effectively with low feedwater quality, and in some scenarios with feedwater quality that is considered unacceptable for steam generation using a once through steam generator OTSG or drum boiler. The feedwater 14 can include fresh water, recycled produced water from a steam-assisted hydrocarbon recovery process or a mixture thereof. Recycled produced water can include high levels of contaminants and impurities (such as volatile organic compounds, residual hydrocarbons, inorganic compounds and/or suspended solids), which can be flared in the DCSG.

In some implementations, all or part of the produced gas 28 can be sent back to a processing facility for separating light hydrocarbons from unwanted compounds, and/or all or part of the produced gas 28 can directly be used as part of the fuel 12 for the DCSG 16. In some implementations, the fuel 12 used for the DCSG can be a mixture including at least a portion of the produced gas 28 and makeup fuel 34. The DCSG 16 can operate using different types of fuel 12, such as be natural gas, syngas, refinery fuel gas, coke, asphaltenes or mixtures thereof. The flexibility in the types of fuel that can be used provides an advantage against escalating natural gas prices or natural gas supply interruptions.

In some implementations, the produced non-gaseous hydrocarbons 30 can include heavy oil and/or bitumen and are typically further processed or upgraded in a processing facility. At least part of the produced water 32 can be recycled back to the DCSG 16 to be used as feedwater. In some implementations, makeup water 42 can be added to the produced water 32 for use as DCSG feedwater. As there is little to no produced gas 28 and produced water 32 during SAGD startup operations, the feedwater 14 and the fuel 12 mainly consist of the makeup water 40 and an external source of fuel supplied to the DCSG 16, respectively. As production from the SAGD operation begins to ramp up, produced gas 28 and produced water 32 can be obtained from the separator 26 and respectively used as part of the fuel 12 and feedwater 14, thereby requiring less makeup water 42 and makeup fuel 34. When the SAGD operation reaches a normal operating stage, the feedwater 14 can mainly include produced water 32, with a varying amount of makeup water 42 added as required. In some implementations, very little makeup water 42 is required when the SAGD operation reaches a ramped-up continuous regime. When the reservoir retains water, as is often the case in SAGD startup, the proportion of makeup water 42 to total feedwater 14 is higher. When more water is recovered from the produced fluids 24, the proportion of makeup water 42 to total feedwater 14 is lower. In some scenarios, more water is released from the reservoir than is injected. In such cases, no makeup water is needed and the excess water recovered can be stored for later use. In some implementations when SAGD is used, high water production can sometimes be observed as a result of prolonged interruptions (e.g., due to phase separation in the reservoir), such as after unplanned events (e.g., fires). In some implementations, other operational events including infill well when in production can lead to different water/oil cuts in produced pad fluids.

Additive Implementations

Still referring to FIG. 1, in some implementations, an additive 44a, 44b, 44c (or a plurality of additives) can be provided to the DCSG 16 and/or to the steam-based mixture 18 of the DCSG 16. The nature and purpose of the additive can vary. In some scenarios, the additive can be added with the goal of improving hydrocarbon recovery. In other scenarios, the additive can be added with the goal of improving well integrity. In some implementations, the temperature and pressure conditions within the main chamber of the DCSG 16 and/or within the steam-based mixture 18 can condition and/or chemically transform the additive in order to impart certain properties to the additive. For example, an additive in liquid state can be provided to the DCSG 16 and contacted with hot combustion gas originating from combustion of the fuel 12 and the oxygen-enriched mixture 10, in order to be vaporised and/or dispersed into the steam-based mixture 18. After contacting the hot combustion gas, the additive can be present in a gaseous state and/or as a dispersed liquid in the steam-based mixture 18.

It should be understood that the expression "in a liquid state", as used herein, refers to the additive being injected into the DCSG as a liquid in pure form, as a mixture with other liquids, or in solution in a solvent such as water. It should also be understood that the expression "in a gaseous state", as used herein, refers to the additive being present as a gas/vapor in the steam-based mixture. It should also be understood that the expression "in a dispersed state", as used herein, refers to the additive being dispersed into the steam-based mixture of the DCSG as gas particles (e.g., a gas mixture) and/or liquid particles (e.g., an aerosol-like phase). In some implementations, the additive is stable under DCSG operating conditions; i.e., the additive can undergo phase transition, but most of the additive does not undergo chemical degradation or chemical reaction(s), which can change its molecular nature. In some implementations, the additive is vaporizable so that a mixture of steam with the additive in gaseous state and/or dispersed state is obtained as the output stream of the DCSG.

In some implementations, the additive can include ammonia in order to obtain a steam/$CO_2$/ammonia mixture as the output stream of the DCSG. In some implementations, the additive can include a volatile amine, in order to obtain a steam/$CO_2$/volatile amine mixture as the output stream of the DCSG. In some implementations, the additive can include urea (e.g., a urea solution such as a urea aqueous solution), in order to obtain a steam/$CO_2$/volatile amine mixture as the output stream of the DCSG. It should be understood that the term "ammonia", as used herein, refers to either gaseous ammonia or ammonia in solution (in water or another solvent). For example, the ammonia can be an ammonium hydroxide aqueous solution. Co-injection of steam with ammonia, urea and/or volatile amine will be discussed in further detail below.

In some implementations, the additive can include at least one of a surfactant, a viscosity reduction agent or a well integrity agent.

It should be understood that the term "surfactant", as used herein refers to amphiphilic compounds (i.e., compounds containing both hydrophobic groups and hydrophilic groups). The surfactant can be nonionic, cationic, anionic or amphoteric. As non-limiting examples, the hydrophobic tail of the surfactant can include a hydrocarbon chain (which can be branched, linear or aromatic), a fluorocarbon chain, a siloxane chain or a polyethylene-like chain (such as polyethylene oxide and/or polypropylene oxide chains). Non-limiting examples of anionic surfactants have anionic functional groups at their heads, such as sulfate, sulfonate, phosphate and carboxylates. Non-limiting examples of cationic surfactants have cationic functional groups at their heads, such as primary, secondary, tertiary ammonium salts (which are pH dependent), quaternary ammonium salts (which are pH independent). Amphoteric surfactants have both cationic and anionic centers at their head (or at two opposed heads). Non-limiting examples of nonionic surfactants include fatty alcohols, polyethylene glycol alkyl ethers, polypropylene glucol alkyl ethers, glucoside alkyl ethers, glycerol alkyl esters, block copolymers of polyethylene glycol and polypropylene glycol, among others.

It should be understood that the term "viscosity reducing agent", as used herein, refers to an agent that, when injected into the reservoir along with the steam-based mixture, reduces the viscosity of the produced fluids compared to the viscosity of produced fluids obtained when no viscosity reducing agent is used. In some scenarios, the viscosity reducing agent can reduce the viscosity of the produced fluids by at least 10%. Non-limiting example of viscosity reducing agents may include alkane-based formulations such as paraffinic oil, diethyl sebacate, diethylene glycol monoethyl ether, ethyl alcohol, ethyl oleate (EO), isopropyl alcohol (IPA), isopropyl myristate, linoleic acid, propionic acid, triethyl citrate, propylene glycol, ethanol, propanol, isopropanol, polyethylene glycol, polyperfluoroethers, fluorocarbon (halothane, methoxyflurane, enflurane, isoflurane, sevoflurane and desflurane, etc.), fluorinated ketone, perfluorodecalin, perfluoroacrylate, perfluoromethacrylate, benzyl alcohol, lauryl alcohol, perfluorodecalin, N-Methyl-2-pyrrolidone, glycofurol, polyethylene glygol (PEG), alkyl ketone, lower alkyl ester of citric acid, benzyl benzoate, methyl benzoate, ethyl benzoate, n-propyl benzoate, isopropyl benzoate, butyl benzoate, isobutyl benzoate, sec-butyl benzoate, tert-butyl benzoate, and isoamyl benzoate, or mixtures thereof.

It should be understood that the term "well integrity agents", as used herein, refers to compounds that can promote structural integrity of the tubing/annulus of an injection or production well, downhole tools (e.g., ESP, instrumentation) and/or structural integrity of the reservoir, if damaged. Non-limiting examples of well integrity agents include anticorrosive agents, antifouling agents, scale inhibitors and thermally stable cements that can block areas of a well that are permeable to steam.

As shown in FIG. 1, in some implementations, additive 44a can be added as part of the feedstream of the DCSG 16, along with the feedwater 14. For example, the additive 44a and the feedwater 14 can be mixed prior to being provided to the DCSG 16. In some implementations, the feedwater 14 can be provided as a feedwater stream and additive 44b can be provided to the DCSG 16 as a separate additive stream. In some implementations, additive 44c can be provided to the output stream 18 of the DCSG 16. In some implementations, the feedwater 14 can be contacted with the hot combustion gas for a longer time period than the additive 44b. In other words, the additive 44b can be provided to the DCSG 16 at an inlet which is distant from the feedwater inlet, so that the additive 44b is not subjected to DCSG temperature and pressure conditions for a time period as long as the feedwater 14.

Ammonia/Volatile Amine Implementations

Still referring to FIG. 1, in some implementations, the additive can include at least one of ammonia, urea and a volatile amine. In such case, a steam/$CO_2$/ammonia mixture, a steam/$CO_2$/volatile amine, steam/$CO_2$/urea, a steam/$CO_2$/ammonia/volatile amine or a steam/$CO_2$/urea/ammonia/volatile amine mixture is obtained as the steam-based mixture 18. In some implementations, ammonia can be generated using the DCSG by reaction of urea and/or of the ammonium hydroxide solution.

It should be understood that the term "volatile amine", as used herein, refers to a single amine or a mixture of amines. In some implementations, such volatile amine can have a boiling point at atmospheric pressure of 150° C. or less, and/or a pKa of 5.0 or more. Non-limiting examples of volatile amine include $C_3$-$C_8$ amines, such as methyl amine, dimethyl amine, trimethyl amine, diethyl amine, ethyl amine, isopropyl amine, n-propyl amine, diethyl amine, 1,1-dimethyl hydrazine, isobutyl amine, n-butyl amine, pyrrolidone, triethylamine, methyl hydrazine, piperidine, dipropylamine, hydrazine, pyridine, ethylenediamine, 3-methoxypropylamine, N, N-diethylhydroxylamine, morpholine, pyrrole, cyclohexylamine or a mixture thereof.

In some embodiments, the ammonia and/or the volatile amine can be provided to the DCSG 16 with the feedwater 14. The ammonia and/or the volatile amine can be mixed with the feedwater 14 prior to being injected into the DCSG 16, or injected into the DCSG 16 separately. In some scenarios, the ammonia can be injected into the DCSG 16 as an aqueous ammonium hydroxide solution. In some scenarios, the volatile amine can be injected into the DCSG 16 as an aqueous solution. In what follows, the term $NH_2$-containing compound is used to refer to ammonia or volatile amine. The feedwater 14 and the $NH_2$-containing compound feedstream can be contacted with hot combustion gases of the DCSG 16 such that a steam-based mixture 18 including steam, $CO_2$ and the $NH_2$-containing compound is obtained. In some scenarios, the $NH_2$-containing compound is in a gaseous state and/or in a dispersed state within the steam-based mixture 18.

Using the DCSG 16 to incorporate the $NH_2$-containing compound into the steam-based mixture 18 can reduce the operating costs, for example, if no separate heating means are needed in order to volatilize the $NH_2$-containing compound. Using the DCSG 16 to incorporate the $NH_2$-containing compound into the steam-based mixture 18 can increase safety, as fewer personnel can be required to handle hazardous material. Using the DCSG 16 to incorporate the $NH_2$-containing compound into the steam-based mixture 18 can also reduce the need to process the $NH_2$-containing compound at a processing facility and the need for pipelining the heated $NH_2$-containing compound from the processing facility to the injection well. The use of an $NH_2$-containing compound can lower steam requirements, as the hydrocarbons in the reservoir can be more easily mobilized.

In some implementations, the concentration of the $NH_2$-containing compound in the steam-based mixture can be between about 0.1 wt % and about 30 wt %, or between about 0.5 wt % and about 10 wt %, or between about 1 wt % and about 5 wt %. In some implementations, the additive includes ammonium hydroxide solution (e.g., 500-2000 ppm of ammonia in water) at a concentration in the steam-based mixture between about 20 and 30 wt %.

In some implementations, the steam-based mixture can have the following composition, which is given as a non-limiting example:
Steam: about 75 wt % to 99.9 wt %
Ammonia: about 0.1 wt % to 30 wt %; and
$CO_2$: about 2 wt % to 12 wt %.

In some implementations, the $NH_2$-containing compound can be provided directly to the combustion mixture of the DCSG. As the temperature and pressure of the output stream of a DCSG are typically high, providing the $NH_2$-containing compound to the output stream of the DCSG can heat up the $NH_2$-containing compound to a temperature which is sufficient so that the $NH_2$-containing compound is vaporized and/or dispersed into the combustion mixture.

Steam-$CO_2$ Separation Implementations

In some scenarios, depending for example on the properties and geological layout of the reservoir, it can be desirable to lower the concentration of $CO_2$ in the injection mixture to be injected into the reservoir. For example, the concentration of $CO_2$ in the injection mixture can be desired to be at most about 4 wt % or at most about 2 wt %.

Figure 2A:
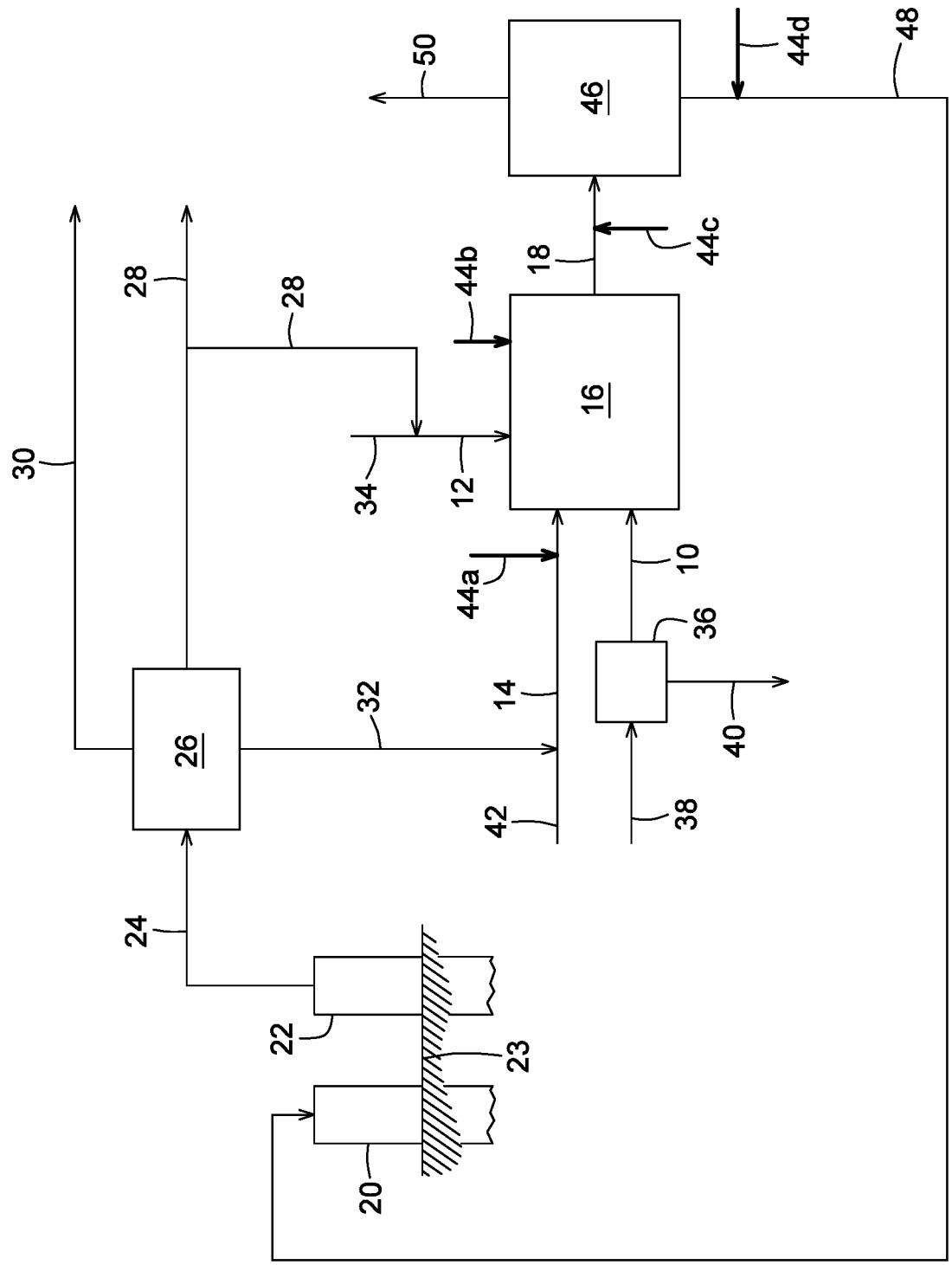
FIG. 2A is a process flow diagram of a hydrocarbon recovery operation, showing possible additive injection points and featuring a steam/$CO_2$ separation step.

Now referring to FIG. 2A, a steam-$CO_2$ separation unit 46 can be provided downstream of the DCSG 16. All or part of the $CO_2$ can be separated from the combustion mixture 18 to obtain a $CO_2$-depleted steam stream 48 and a $CO_2$-rich stream 50. The $CO_2$-depleted steam stream 48 can be injected into the reservoir through the injection well 20. In some implementations, the additive 44a, 44b, 44c can be added similarly as described above. In some implementations, the additive 44d can be added to the $CO_2$-depleted steam stream 48, downstream of the steam-$CO_2$ separation.

Figure 2B:
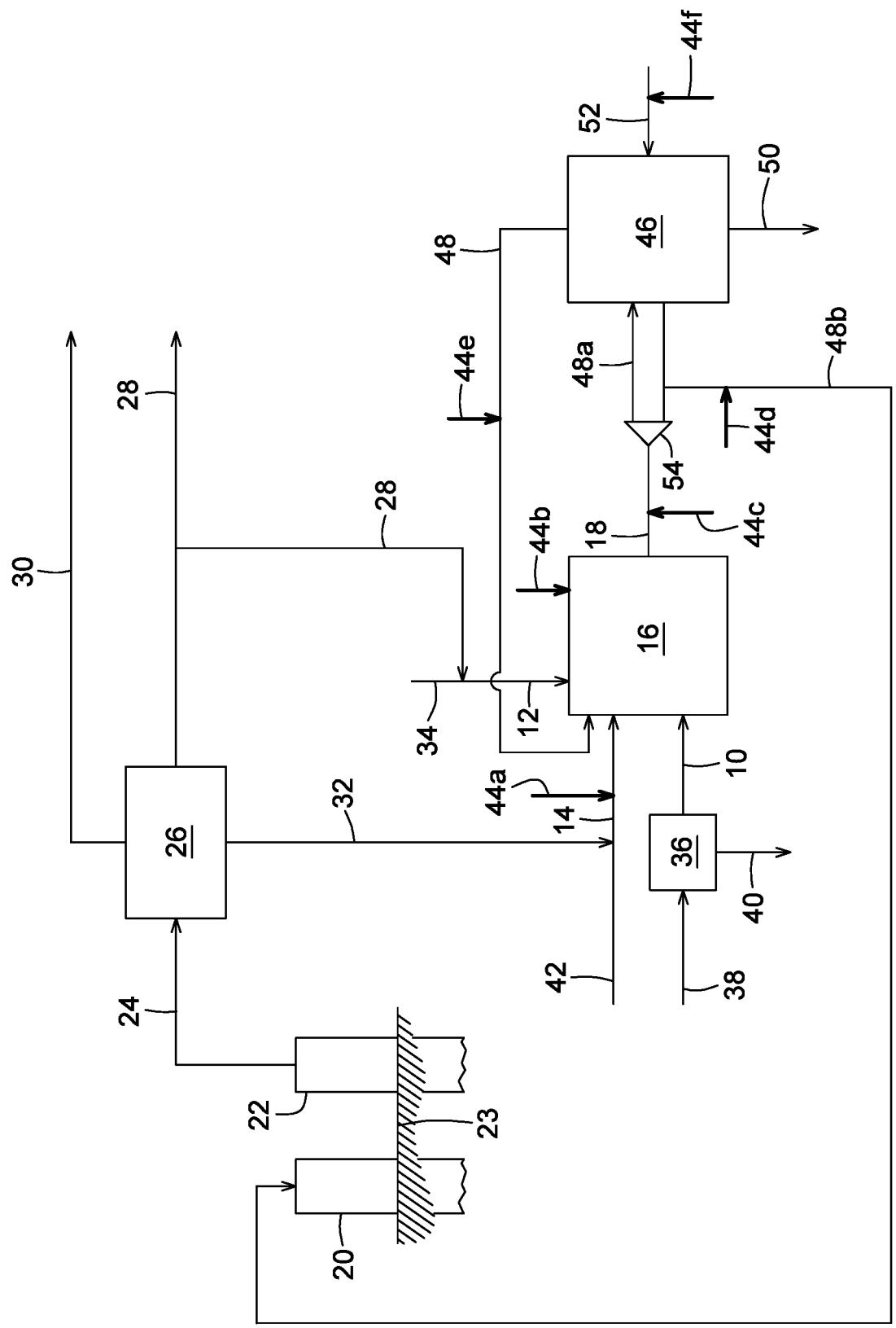
FIG. 2B is a process flow diagram of a hydrocarbon recovery operation, showing possible additive injection points and featuring a steam/$CO_2$ membrane separation step.

Now referring to FIG. 2B, in some implementations, the combustion mixture 18 can be split into at least two separate portions 48A and 48B. The first portion 48A can be supplied to a steam-$CO_2$ separation unit 46. All or part of the $CO_2$ can be separated from the first portion 48A in the steam-$CO_2$ separation unit 46 in order to obtain a $CO_2$-depleted steam stream 48 and a $CO_2$-rich stream 50. In some implementations, the steam-$CO_2$ separation unit 46 can include a membrane separation unit including at least one separation membrane suitable for separating at least part of the steam and at least part of the $CO_2$ from a DCSG combustion mixture. Optionally, when a steam-$CO_2$ membrane separation unit 46 is used, sweep gas 52 can be provided to the separation unit 46 for driving the separation. The sweep gas 52 can be composed of a combustible mixture which is suitable to (i) drive the separation of the steam and $CO_2$ from the combustion mixture 18 and (ii) be used as fuel for a DCSG, for example when the $CO_2$-depleted steam stream 48 is recycled back into the DCSG 16. When the sweep gas 52 is used as part of the fuel, the $CO_2$-depleted steam stream 48 mainly includes steam and sweep gas 52, and can also include a residual amount of $CO_2$. For example, the sweep gas 52 can include natural gas or other combustible fuel gases such as lower hydrocarbons (e.g., methane, ethane, propane and/or butane), a synthetic fuel gas such as syngas, or a refinery fuel gas. For example, the concentration of steam in the $CO_2$-depleted steam stream 48 can be up to 90 wt %, and the concentration of sweep gas in the $CO_2$-depleted steam stream 48 can be up to 10 wt %. The concentration of residual $CO_2$ in the $CO_2$-depleted steam stream 48 can be up to 1 wt %. It is understood that the composition of the $CO_2$-depleted steam stream can vary when the additive is added at 44a, 44b and/or 44c, and that in such case, the nature and/or amount of sweep gas which is needed for the separation can also vary.

In some implementations, the $CO_2$-rich stream 50 is mainly composed of $CO_2$. For example, the concentration of $CO_2$ in the $CO_2$-rich stream 50 can be up to 90 wt %, and the concentration of steam in the $CO_2$-rich stream 50 can be up to 10 wt %. It should be understood that the concentration of $CO_2$ in the $CO_2$-rich stream depends on the type of separation unit 46 used and can change depending on various operating factors, such as the concentration of $CO_2$ in the combustion mixture 18, the temperature and pressure at which the separation is effected and the nature and concentration of sweep gas 52 used.

Still referring to FIG. 2B, in some implementations, the $CO_2$-depleted steam stream 48 is recycled back to the DCSG 16. As the $CO_2$-depleted steam stream 48 includes mainly steam and sweep gas, the $CO_2$-depleted steam stream 48 can be suitable for use as part of the feedwater 14 and part of the fuel 12 for the DCSG 16. As the $CO_2$-depleted steam stream 48 typically only includes a residual amount of $CO_2$, recycling the $CO_2$-depleted steam stream 48 back to the DCSG 16 can facilitate gradually lowering the concentration of $CO_2$ in the combustion mixture 18 until steady-state or quasi steady-state concentrations are reached. The combustion mixture 18 is split (e.g., using a splitter 54) into the first portion 48A which is introduced into the steam-$CO_2$ separation unit 46 and the second portion 48B which can be used for the desired application, such as injection into a hydrocarbon-bearing reservoir. The amount of the combustion mixture 18 supplied to the steam-$CO_2$ separation unit 46 (i.e., the first portion 48A) depends on the desired concentration of $CO_2$ in the combustion mixture 18 when the steady-state regime or quasi steady state regime is reached.

Still referring to FIG. 2B, in some implementations, the additive 44a, 44b, 44c can be added similarly as described above. In some implementations, the additive 44d can be added into the second portion 48B of the combustion mixture, after separation by the splitter 54, and before the second portion 48B is injected into the reservoir. In some implementations, the additive 44e can be added to the $CO_2$-depleted steam stream 48 prior to the $CO_2$-depleted steam stream 48 being recycled back to the DCSG 16. In some implementations, the additive 44f can be added to the sweep gas stream 52, for example in order to help drive the separation of the steam and the $CO_2$. It is understood that not all additives can be added at any injection point. For example, an additive which is not stable under DCSG operating conditions is not to be added at 44a. Similarly, an additive which cannot act as a sweep gas is not to be added at 44f. In some implementations, the produced fluid 24 can include a portion of the additive injected into the reservoir. In some implementations, the separator 26 can separate the additive from the produced fluid 24 and the recovered additive can be re-used at any one of the injection points discussed herein.

Remote Injection Implementations

Figure 3:
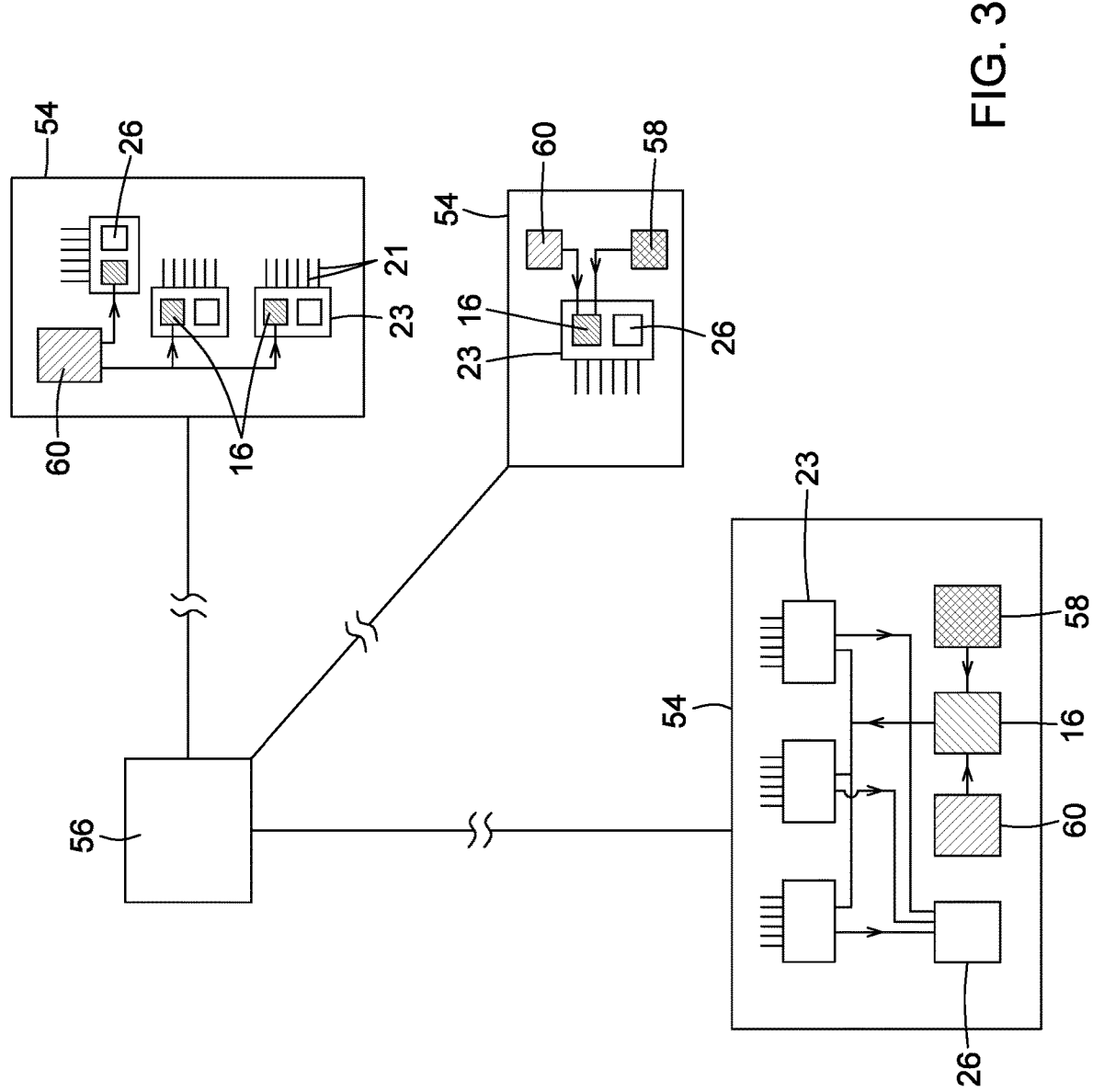
FIG. 3 is a top schematic view of a hydrocarbon recovery system with steam generation, water recycling and additive delivery at remote hydrocarbon recovery facilities.

Referring to FIG. 3, a SAGD operation is shown, which includes several remote hydrocarbon recovery facilities 54 located at a remote distance from a processing facility 56 supporting the SAGD operation. Each of the remote hydrocarbon recovery facilities can include at least one steam generator 16, at least one well pad 23 for supporting the SAGD wells and associated equipment and piping, SAGD well pairs 21 extending from the well pad 23 into the reservoir, and at least one separator 26.

It should be understood that "located at a distance" means that the hydrocarbon recovery facilities 54 are not located in proximity to the processing facility 56. It is typical for the processing facility 56 to be located several kilometers from the remote hydrocarbon recovery facilities 54 being supported. It should also be understood that a "remote hydrocarbon recovery facility" is a facility that is located in a geographical area and includes at least one well pad 23 with corresponding SAGD well pairs 21, at least one steam generator 16 and at least one separator 26. The steam generator 16 and the separator 26 are installed in proximity to the at least one well pad 23. In this context, it should be understood that "in proximity" means that the steam generator 16 and separator 26 are located on the well pads 23 for supplying steam to the wells of the same well pad and treating production fluids retrieved from the same well pad; on an adjacent well pad 23 of the same hydrocarbon recovery facility 54; or in the general area as the well pads 23 of the given hydrocarbon recovery facility 54 and remote from the processing facility 56. Some examples of "in proximity" could mean that the steam generator 16 and separator 26 are located within about 200 meters, about 100 meters, about 50 meters, or even about 20 meters of the well pads 23.

Still referring to FIG. 3, each remote hydrocarbon recovery facility 54 can be provided with at least one water supply tank 58 and at least one additive supply tank 60. In some scenarios, a water supply tank 58 and/or an additive supply tank 60 provided at the remote hydrocarbon recovery facilities can remove or reduce the need for conveying water and/or additive from the distant processing facility 56, and can therefore reduce costs associated with pipelining or transporting the water and/or the additive. In some implementations, an additive tank can be provided at the remote hydrocarbon recovery facility 54 to reduce the transporting and/or handling of the additive over long distances.

Disposal of Volatile Organic Compounds (VOCs) Implementations

In some implementations, the DCSG can include a waste inlet for receiving a waste stream to be flared (i.e., destroyed). The waste stream can for example include volatile organic components (VOCs) which can originate from any stream of the hydrocarbon recovery operation which contains organic components. For example, waste streams originating from the separation of the produced fluids 24 into the produced gas 28 and/or non-gaseous hydrocarbon component 30 can be provided to the DCSG 16 and be injected along with the feedwater 14 or in conjunction with the feedwater 14 to be flared under DCSG operating conditions. In some implementations, the waste streams to be flared can originate from third parties.

Additives with Carrier Gas Implementations

In some implementations, the additive to be provided to the DCSG 16 can be carried by a heat carrier gas. The heat carrier gas can provide thermal stability to the additive during operation of the DCSG. This can be useful in scenarios where the additive is not stable under DCSG operating conditions, in order to improve the stability of the additive. In some scenarios, the heat carrier gas can absorb at least part of the heat instead of the additive, thereby allowing a higher proportion of the additive to exit the DCSG without being degraded and while retaining the properties of the additive. Non-limiting examples of carrier gases include non-condensable gases such as $CO_2$ and nitrogen, steam at a lower temperature than outgoing steam.

System Implementations

In some implementations, there is provided a system for recovering hydrocarbons from a reservoir. The system includes a DCSG 16 for generating a combustion mixture 18. The DCSG 16 has an oxygen inlet, a fuel inlet and a feedwater inlet respectively connected to an oxygen supply line, a fuel supply line and a feedwater supply line. The DCSG can also have an additive inlet connected to an additive supply. In some implementations, the additive supply can be connected to the feedwater supply line, for providing the additive through the feedwater inlet. The DCSG 16 is provided with a combustion mixture outlet, and is in fluid communication with the injection well.

The production well 22 can allow for the recovery of the produced fluids 24 from the reservoir. The system can also include a separator 26 in fluid communication with the production well 22 to receive the produced fluids 24. The separator 26 can produce produced gas 28, produced non-gaseous hydrocarbons 30 and produced water 32. The separator 26 can be in fluid communication with the DCSG 16, for example to feed at least a portion of the produced water 32 as feedwater to the DCSG 16, or to feed at least a portion of the produced gas 28 as fuel to the DCSG 16.

In some implementations, a steam-$CO_2$ separation unit can be provided downstream of the DCSG and upstream of the injection well. The steam-$CO_2$ separation unit 46 can be provided with a combustion mixture inlet, a sweep gas inlet, a $CO_2$-rich stream outlet and a $CO_2$-depleted steam stream outlet. In some implementations, the combustion mixture outlet of the DCSG 16 can be connected to the steam-$CO_2$ separation unit 46 through a splitter 54, and the $CO_2$-depleted steam stream outlet of the separation unit 46 can be connected to the fuel inlet (or another dedicated $CO_2$-depleted steam stream inlet) of the DCSG 16. The splitter 54 separates the combustion mixture 18 into first and second portions 48A, 48B. The system also includes a well pad 23 supporting a well pair, the well pair including an injection well 20 and a SAGD production well 22.

Well-known methods, procedures and components have not been described in detail so as not to obscure the above description. The steps or operations in the flow charts and diagrams described herein are just for example and are not to be considered limiting. There may be variations to these steps or operations without departing from the principles discussed herein. For instance, the steps may be performed in a differing order, or steps may be added, deleted, or modified.

Although the above principles have been described with reference to certain specific examples and implementations, various modifications thereof will be apparent to those skilled in the art as outlined in the appended claims.

The invention claimed is:

1. A process for in situ thermal recovery of hydrocarbons from a reservoir, comprising:
   providing an oxygen-enriched mixture, fuel, feedwater and an additive comprising at least one of ammonia, urea or a volatile amine to a direct-contact steam generator (DCSG);
   operating the DCSG, comprising contacting the feedwater and the additive with hot combustion gas to obtain a steam-based mixture comprising steam, $CO_2$ and the additive;
   injecting the steam-based mixture or a stream derived from the steam-based mixture into the reservoir to mobilize the hydrocarbons therein; and
   producing a produced fluid comprising the hydrocarbons.

2. The process of claim 1, wherein the additive comprises ammonia.

3. The process of claim 2, wherein the ammonia is provided as an ammonium hydroxide solution.

4. The process of claim 1, wherein the concentration of the additive in the steam-based mixture is between about 0.1 wt % and about 30 wt %.

5. The process of claim 1, wherein the steam-based mixture comprises the additive in a gaseous and/or vapor state.

6. The process of claim 1, wherein the additive further comprises at least one of a viscosity reduction agent or a well integrity agent, wherein the well integrity agent comprises an anticorrosive agent, an antifouling agent, a scale inhibitor or thermally stable cement or wherein the well integrity agent is configured to promote structural integrity of a tubing or annulus of an injection well or a production well, of a downhole tool or of the reservoir if damaged, or a combination thereof.

7. The process of claim 1, wherein the feedwater and the additive are provided as a single feed stream to the DCSG.

8. The process of claim 1, wherein the feedwater is provided as a feedwater stream and the additive is provided as a separate additive stream, to the DCSG.

9. The process of claim 8, wherein the feedwater stream is contacted with the hot combustion gas for a longer time period than the additive stream.

10. The process of claim 1, wherein the additive is provided to the DCSG and the steam-based mixture is injected into the reservoir during start-up.

11. The process of claim 1, further comprising providing a waste stream comprising volatile organic components (VOCs) to the DCSG, in order to flare the VOCs in the DCSG.

12. The process of claim 1, further comprising separating the produced fluid into produced gas, a non-gaseous hydrocarbon component and produced water.

13. The process of claim 12, wherein the feedwater comprises at least part of the produced water.

14. The process of claim 13, wherein the feedwater further comprises makeup water, the concentration of the makeup water in the feedwater being of up to about 5 wt % of the feedwater.

15. The process of claim 1, wherein the additive comprises at least the volatile amine, which is selected from methyl amine, dimethyl amine, trimethyl amine, diethyl amine, ethyl amine, isopropyl amine, n-propyl amine, diethyl amine, 1,1-dimethyl hydrazine, isobutyl amine, n-butyl amine, pyrrolidone, triethylamine, methyl hydrazine, piperidine, dipropylamine, hydrazine, pyridine, ethylenediamine, 3-methoxypropylamine, N,N-diethylhydroxylamine, morpholine, pyrrole, cyclohexylamine or a mixture thereof.

16. A system for recovering hydrocarbons from a reservoir, comprising:
   a DCSG for generating a steam-based mixture, the DCSG comprising:
      an oxygen inlet for receiving an oxygen-enriched mixture;
      a fuel inlet for receiving fuel; and
      at least one inlet for receiving feedwater and an additive comprising
         at least one of ammonia, urea or a volatile amine, the steam-based mixture comprising steam, $CO_2$ and the additive;
   an injection well in fluid communication with the DCSG to receive the steam-based mixture or a stream derived from the steam-based mixture;

a production well for recovering produced fluids from the reservoir; and a hydrocarbon separating unit in fluid communication with the production well to receive the produced fluids and separate the hydrocarbons from the produced fluids.

17. The system of claim 16, wherein the additive comprises ammonia.

18. The system of claim 17, wherein the ammonia is provided as an ammonium hydroxide solution.

19. The system of claim 17, wherein the steam-based mixture comprises the additive in a gaseous state.

20. The system of claim 16, wherein the additive further comprises at least one of a viscosity reduction agent or a well integrity agent, wherein the well integrity agent comprises an anticorrosive agent, an antifouling agent, a scale inhibitor or thermally stable cement or wherein the well integrity agent is configured to promote structural integrity of a tubing or annulus of an injection well or a production well, of a downhole tool or of the reservoir if damaged, or a combination thereof.

21. The system of claim 16, wherein the concentration of the additive in the steam-based mixture is between about 0.1 wt % and about 30 wt %.

22. The system of claim 16, wherein the at least one inlet for receiving the feedwater and the additive is a single inlet, such that the feedwater and the additive are provided as a single feed stream to the DCSG.

23. The system claim 16, wherein the at least one inlet for receiving the feedwater and the additive comprises a feedwater inlet and a separate additive inlet, such that the feedwater is provided as a feedwater stream and the additive is provided as a separate additive stream, to the DCSG.

24. The system of claim 16, wherein the injection well and the production well are formed within two separate well bores.

25. The system of claim 16, wherein the injection well and the production well are formed within a single well bore.

26. A process for in situ thermal recovery of hydrocarbons from a reservoir, comprising:

providing an oxygen-enriched mixture, fuel, feedwater and an additive in liquid state to a DCSG, wherein the additive comprises at least one of a surfactant or a viscosity reduction agent for reducing the viscosity of the hydrocarbons;

operating the DCSG, comprising contacting the feedwater and the additive with hot combustion gas to obtain a steam-based mixture comprising steam, $CO_2$ and the additive in a gaseous state and/or a dispersed state; and injecting the steam-based mixture or a stream derived from the steam-based mixture into the reservoir to mobilize the hydrocarbons therein; and producing a produced fluid comprising the hydrocarbons.

27. The process of claim 26, wherein the additive is in a gaseous state in the steam-based mixture.

28. The process of claim 26, wherein the additive is in a dispersed state.

29. The process of claim 26, wherein all of the steam-based mixture generated by the DCSG is injected into the reservoir.

* * * * *